United States Patent

Kimber et al.

[11] Patent Number: 5,903,716
[45] Date of Patent: May 11, 1999

[54] VIRTUAL PRINTER

[75] Inventors: Charles M. Kimber, Palmdale; Allen E. Russ, Thousand Oaks; Michael L. Steen, Newbury Park, all of Calif.

[73] Assignee: Dataproducts Corporation, Simi Valley, Calif.

[21] Appl. No.: 08/870,083

[22] Filed: Jun. 5, 1997

Related U.S. Application Data

[63] Continuation of application No. 08/270,153, Jul. 1, 1994, Pat. No. 5,638,497, which is a continuation-in-part of application No. 08/216,600, Mar. 23, 1994, Pat. No. 5,371,837, which is a continuation-in-part of application No. 07/933,057, Dec. 18, 1992, abandoned.

[51] Int. Cl.$^6$ .................................................... G06K 15/00
[52] U.S. Cl. .................................... 395/114; 395/112
[58] Field of Search ................................ 395/101, 112, 395/114, 115, 116, 828, 829, 831, 834; 400/61, 62, 70, 71, 76; 356/444, 452, 467

[56] References Cited

U.S. PATENT DOCUMENTS

| | | | |
|---|---|---|---|
| 5,047,953 | 9/1991 | Ikenoue | 364/519 |
| 5,075,874 | 12/1991 | Steeves et al. | 395/112 |
| 5,303,336 | 4/1994 | Kageyama et al. | 395/114 |
| 5,371,837 | 12/1994 | Kimber et al. | 395/114 |
| 5,638,497 | 6/1997 | Kimber et al. | 395/114 |

*Primary Examiner*—Arthur G. Evans
*Attorney, Agent, or Firm*—Pillsbury Madison & Sutro LLP

[57] ABSTRACT

A work station user selects a desired printer default configuration. Thereupon an address exclusively associated with the selected default configuration is appended to the print data sent from the work station to the printer. Default configuration setting circuitry provided, e.g., in a circuit card installed in the printer receives the address and, via a look-up table, provides instructions for implementing the default configuration associated with the address. The printer is then configured in accordance with the selected default configuration.

23 Claims, 6 Drawing Sheets

VIRTUAL PRINTER

RELATED APPLICATION INFORMATION

This is a continuation of U.S. continuation-in-part patent application Ser. No. 08/270,153, filed Jul. 1, 1994, which is a continuation-in-part of patent application Ser. No. 08/216,600, filed Mar. 23, 1994, which issued as U.S. Pat. No. 5,371,837, which was a continuation-in-part application of Ser. No. 07/993,057, filed, Dec. 18, 1992, now abandoned.

BACKGROUND OF THE INVENTION

1. Field of the Invention

The present invention relates to apparatus and methods for controlling the configuration of a printer and, in particular embodiments, for allowing a user to select a printer default configuration from a plurality of preset default configurations to control a printer connected in a multiple work station network.

2. Description of Related Art

In a typical computer printer, it is necessary to establish a default configuration. Typically, the printer has a default configuration set by the user or preset by the manufacturer. Default configurations comprise sets of instructions for controlling certain parameters of the printing operations performed by the printer, including, but not limited to, fonts, paper sizes, page description languages, finishing options and stackers. Data or instructions for setting the default configuration are typically stored in a memory circuit within the printer.

In a typical network system, e.g., wherein one or more printers are connected, through a network communications link, to a plurality of individual work stations (e.g., personal computer terminals), each printer will have a preset default configuration, as discussed above. Each work station accessing a printer must operate with the default configuration set for that printer. It is often the case in a multiple work station network that the user of one work station will require a printer default configuration different than the printer default configuration required by the user of another work station.

If more than one printer is connected in the network, each printer may have a default configuration different from the default configuration set for the other printers in the network. Any one printer may be selectively accessed by a work station user by selecting that printer's network port. In this regard, by connecting a plurality of printers in the network through a corresponding plurality of network ports, a work station user may select the printer (and, thus, the default configuration set for that printer) to accommodate that user's printing needs.

However, the cost of including multiple printers in a network can be relatively high, especially where a large number of printers (and default configurations) are required. Moreover, the physical capabilities of the work stations or the network communications link may limit the number of printer network ports (and, thus, the number of printers having different default configurations) operable in the network. Thus, there is a need in the industry for an economical system which allows work stations in a network to operate with multiple printer default configurations, e.g., by allowing the work station users to select any one of the multiple printer default configurations.

SUMMARY OF THE DISCLOSURE

In a network, a device typically has a unique communications protocol address for each protocol compatible therewith. In embodiments of the present invention, the print server responds to multiple protocol addresses. Each address to which the print server responds is uniquely associated with a default configuration.

In accordance with one embodiment of the invention, a printer is selectively controlled to operate as any one of a plurality of "VIRTUAL PRINTERs." ("VIRTUAL PRINTER" is a Trademark of the assignee, Dataproducts Corporation.) Each "VIRTUAL PRINTER" has a default configuration which differs from the default configuration of the other "VIRTUAL PRINTERs." In this regard, a single printer connected in a network through a single printer network interface can be operated in accordance with any one of the plural default configurations.

A work station user selects a desired printer default configuration by selecting a unique communications protocol address associated with that default configuration. By directing the print data to the selected communications protocol address, the printer automatically assumes the default configuration associated with that address. Default configuration setting circuitry provided, e.g., in a circuit card installed in the printer, is programmed to respond to the communications protocol address and, via a look-up table, provide instructions for implementing the default configuration associated with the address. The printer is then configured in accordance with the selected default configuration.

If the same work station user or another work station user desires a different printer default configuration, the new default configuration is selected by that user and print data sent from that work station is directed to the communications protocol address associated with the new default configuration. The default configuration setting circuitry provides instructions for implementing the default configuration associated with the communications protocol address in the manner discussed above, such that the printer is then configured in accordance with the new default configuration.

In this regard, print data for a plurality of printer default configurations can be sent through a single printer network interface to a single printer. The printer can be configured in accordance with any one of the plural default configurations, thus obviating the need to connect a plurality of printers (each having a different default configuration) through a plurality of printer ports in the network. As a result, considerable cost in providing a separate printer for each default configuration can be avoided. In addition, with the reduction in individual printers connected in the network, the number of printer ports needed in the network may be reduced.

Each printer default configuration will appear to the user as a separate printer, i.e. a "VIRTUAL PRINTER" having its own unique set of operating parameters differing from those of other VIRTUAL PRINTERs. As discussed above, such operating parameters may include, but are not limited to, font, paper size, page description language, finishing option and stacker parameters. In addition, each VIRTUAL PRINTER may have an "interruptable" (or "noninterruptable") parameter which allows a print job to be interrupted (or to prohibit interruption) by another print job directed to another VIRTUAL PRINTER address.

Further embodiments provide status information to the user regarding the VIRTUAL PRINTER accessed by the user or regarding the physical condition of the printer itself. Yet further embodiments provide selective access (or authorized access) features, wherein one or more VIRTUAL PRINTERs is accessible by only authorized users. Additional embodiments employ VIRTUAL PRINTER parameters for further operations, such as facsimile, scanner, external memory of other suitable operations and functions. Further embodiments employ a "print pending" feature, wherein a user may direct a print job to a selected VIRTUAL PRINTER address, but delay printing until an additional code is entered either manually at the printer or from the user's work station or other network location. Other objects, benefits and features of the present invention will be apparent from the following description.

BRIEF DESCRIPTION OF THE DRAWINGS

The detailed description will be made with reference to the accompanying drawings, wherein like numerals designate corresponding parts in the several figures.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

As discussed above, in one embodiment of the invention, a printer is selectively controlled to operate as any one of a plurality of "VIRTUAL PRINTERs." Each VIRTUAL PRINTER has a default configuration which differs from the default configuration of the other VIRTUAL PRINTERs. In this regard, a single printer connected in a network through a single printer network interface can be operated in accordance with any one of the plural default configurations.

Figure 1:
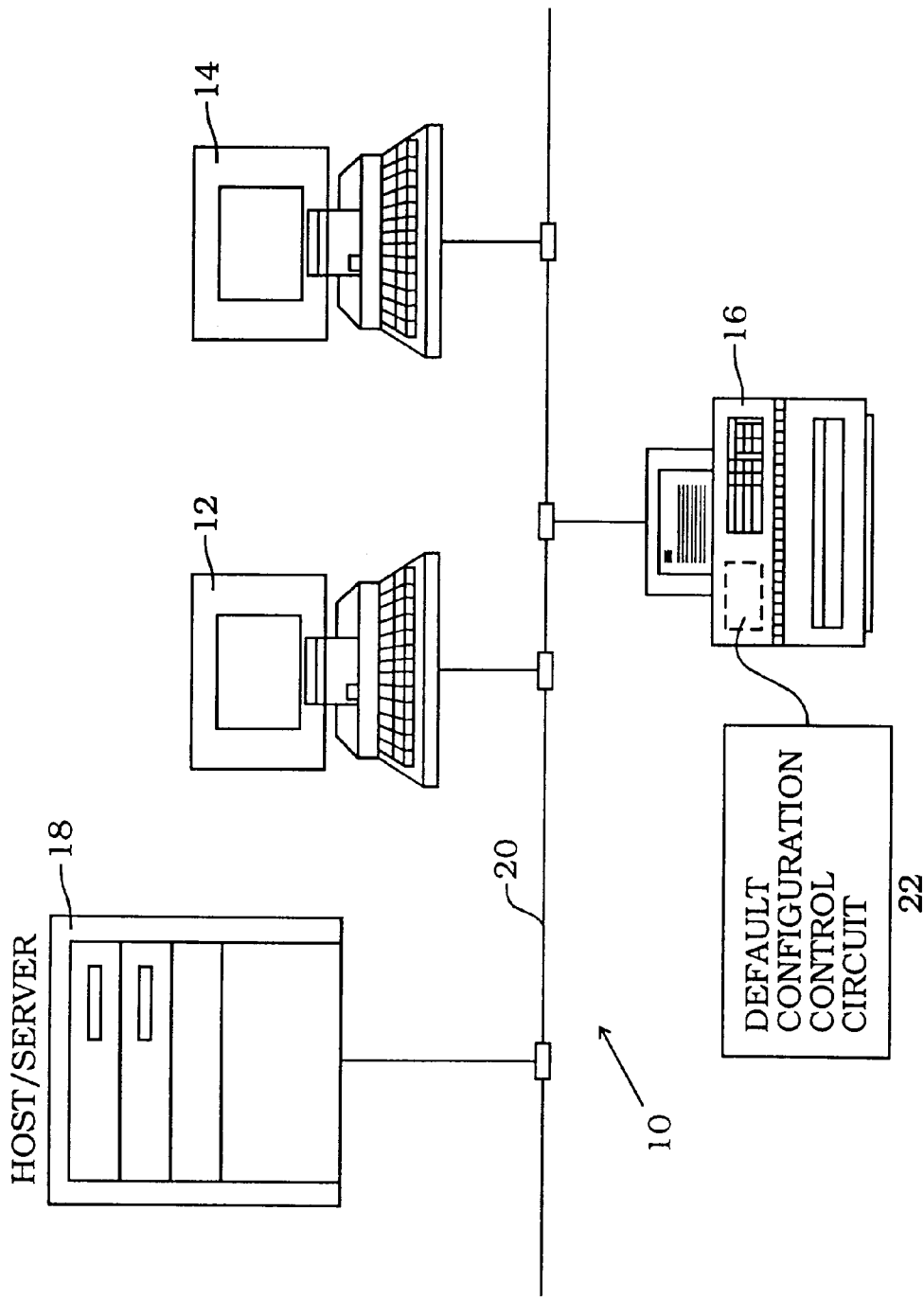
FIG. 1 is a block diagram of a computer network employing an embodiment of the present invention.

FIG. 1 is a block diagram of a computer network 10 in which a number of individual work stations are connected, through a network communications link, to a printer station. The individual work stations, shown at reference numbers 12 and 14, may be, for example, personal computer terminals (PCs). The printer station may comprise, for example, an ink jet printer (with a default configuration control circuit as discussed below) as shown at reference character 16. FIG. 1 also shows a host/server station 18 connected in the network. A network communications link 20 interconnects the above discussed stations 12–18.

The default configuration, with which the printer 16 operates for any given printing job, is controlled by a default configuration control circuit 22. In the illustrated embodiment, the circuit 22 is provided in a circuit card mounted inside of the printer housing. However, it will be understood that, in other embodiments, the circuit 22 may be provided external to the printer housing or otherwise suitably connected between the print engine and the printer network interface.

In response to print job signals sent from a work station 12 or 14 or from a host server, the circuit 22 selects a set of default configuration instructions from a plurality of sets of such instructions. The selected set of instructions are provided to the general default control circuitry of the printer to set the printer's default configuration. The selection of the particular set of default configuration instructions is controlled by the user's selection of the communications protocol address associated with the default configuration.

The printer 16, with the control circuit 22, has multiple default configurations, each designated as a "VIRTUAL PRINTER". Circuit 22 could be implemented in hardware and/or software. Each VIRTUAL PRINTER is associated with a unique communications protocol address. When accessing the printer, the user of the accessing work station, e.g., work station 12, directs the print job to the communications protocol address of the VIRTUAL PRINTER with the default configuration desired by the user.

As discussed below, upon receiving the print job from work station 12, the circuit 22 recognizes the communications protocol address as being associated with one of the VIRTUAL PRINTERs. The circuit 22 then provides the printer 16 with printer default configuration instructions for the VIRTUAL PRINTER associated with the communications protocol address. In response to the instructions from circuit 22, the printer 16 is automatically set to the default configuration specified for the VIRTUAL PRINTER associated with the communications protocol address selected at the work station 12, without manual action on the operator control panel of the printer. With the printer 16 set in accordance with the selected default configuration, the print job from the work station 12 is processed by the printer.

The circuit 22 includes an address processing circuit and a look-up table and associated memory for storing a plurality of default configuration instruction sets with a corresponding plurality of communications protocol addresses. The circuit 22 receives a print data signal from the work station 12 directed to the selected communications protocol address. The circuit 22 processes the communications protocol address and provides the default configuration instruction set corresponding to the communications protocol address in the look-up table, for setting the printer 16 with a particular default configuration (or VIRTUAL PRINTER). Thus, the work station user can set the physical printer 16 to any one of the plurality of default configurations (VIRTUAL PRINTERs) by selecting the associated communications protocol address and sending the print job signals to that address.

Figure 2:
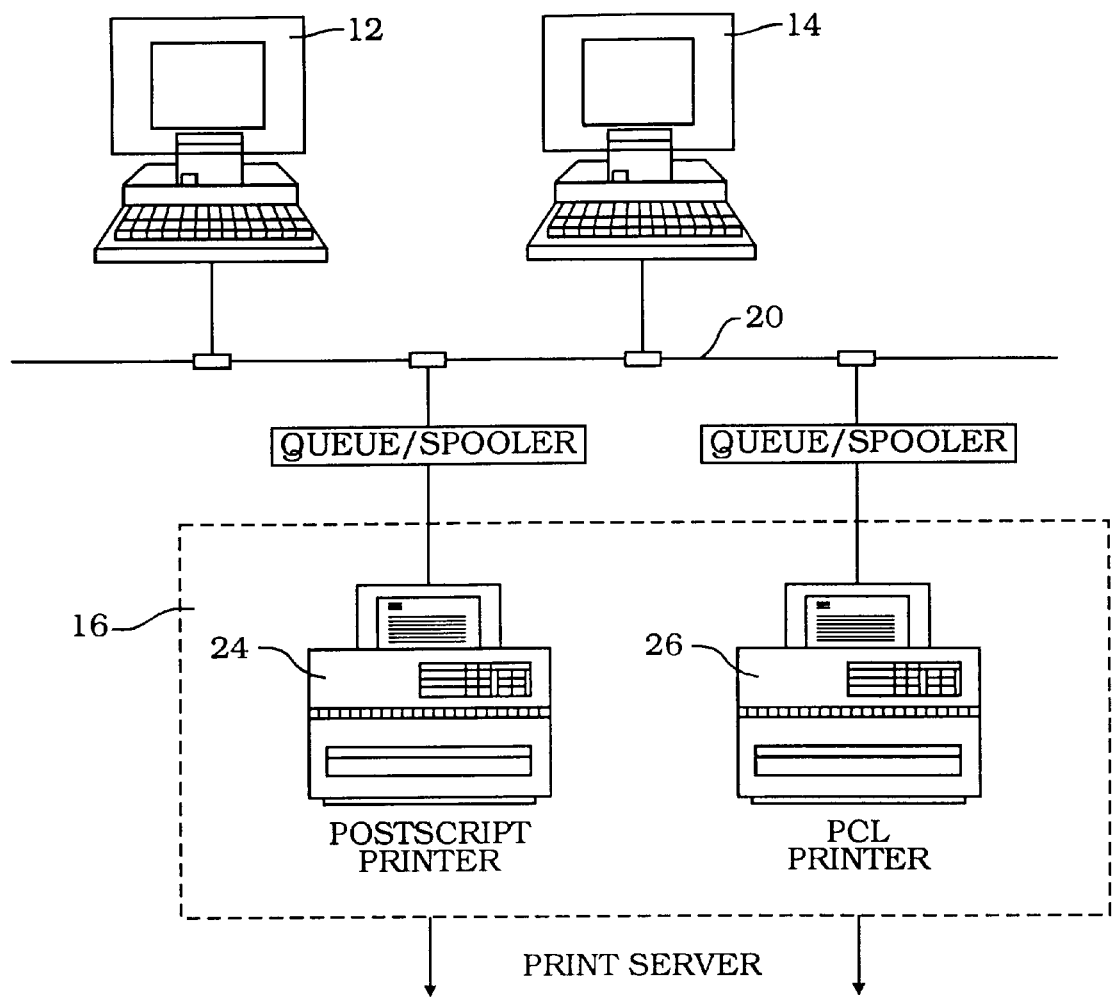
FIG. 2 is a block diagram representing the computer network of FIG. 1; as perceived by a work station user.

In this manner, the physical printer 16 appears to the work station user as a plurality of VIRTUAL PRINTERs, each of which are uniquely addressable. FIG. 2 is a block diagram representing this user perceived arrangement with two VIRTUAL PRINTERs 24 and 26. FIG. 2 also shows a "Queue/Spooler" for each VIRTUAL PRINTER, as perceived by the work station user. The "Queue/Spooler" function may actually be performed by the Host/Server 18 (FIG. 1) or the work station itself.

Figure 3:
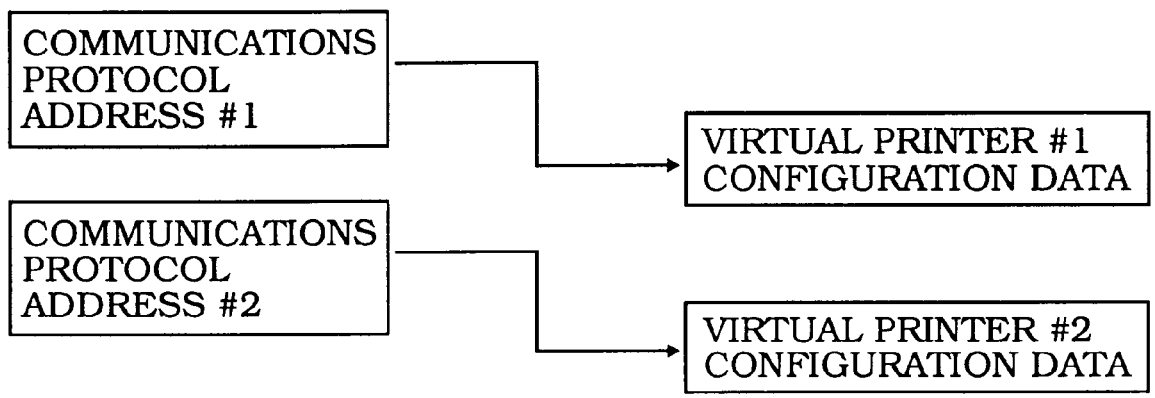
FIG. 3 is a block diagram representing a look-up table of a printer default configuration control circuit indexed by the communications protocol address in accordance with an embodiment of the present invention.

FIG. 3 is a block diagram representing the look-up table for the circuit 22. Each box on the right side of FIG. 3 corresponds to an addressable location of a memory circuit wherein the printer default configuration instructions for a particular VIRTUAL PRINTER are stored. The communications protocol address provided from the work station is converted into a table index and the VIRTUAL PRINTER configuration instructions corresponding to the table index are provided to configure the physical printer 16 for the print job provided by the work station. The memory circuit may be provided as part of the printer's general memory circuit or may be provided as an additional circuit internal or external to the printer housing.

Figure 4:
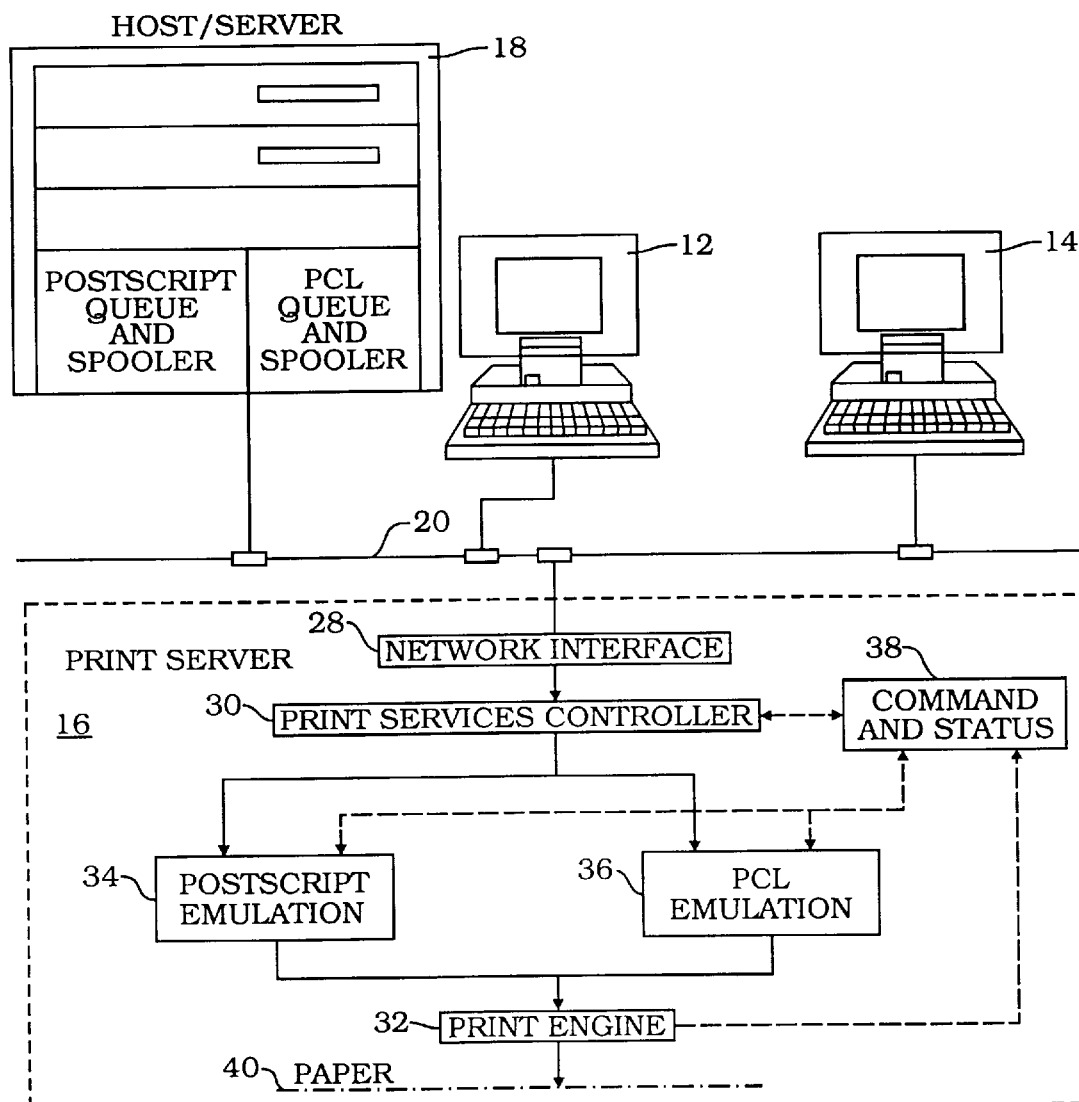
FIG. 4 is a block diagram of the network shown in FIG. 1, with a further representation of internal architecture of the printer shown in FIG. 1.

FIG. 4 is a block diagram of the network shown in FIG. 1, with a further representation of internal architecture of the printer 16 and the printer network interface. The printer network interface 28 connects the rest of the printer with the network communications link 20. A print services controller 30 provides the general processing functions for operating the print engine 32, including monitoring the system for status and for faults, such as the occurrence of low toner or a paper jam. In this embodiment, the processor and look-up table for the printer default configuration control circuit 22 is included in the controller 30. Thus, the printer default configuration control circuit 22 may be provided within the printer's general control circuitry. Alternatively it may be provided, as discussed above, in a circuit card added to the printer's ordinary control circuitry or as an external circuit, external to the printer housing and located after the printer network interface.

FIG. 4 also shows further printer components, including PostScript Emulation and PCL Emulation circuits 34 and 36 and a Command and Status circuit 38. The emulation circuits 34 and 36 function, generally to interpret print job data and provide print engine control signals to the print engine 32. Emulation circuit 34 operates for POSTSCRIPT (trademark) and ADOBE (trademark) type printers and emulation circuit 36 operates for HEWLETT PACKARD (trademark) type printers. Further embodiments may have emulation circuits for other types of printers.

The Command and Status circuit 38 receives signals from the print services controller 30, the emulation circuits 34 and 36 and the print engine 32 and provides control signals to the print services controller and the emulation circuits, e.g., for the fault monitoring functions, etc. The print engine 32 may be, for example a 30 PPM (page-per-minute) print engine. Print engine control signals from the emulators 34 and 36 control the print engine 32 to print on a print medium, such as paper 40.

In operation, a work station user selects a first printer default configuration for a first print job. Thereupon the data for the first print job is sent to the first communications protocol address exclusively associated with the selected default configuration. The work station may be controlled, e.g., by software which provides user prompting indicia on the work station terminal for instructing a user to make a default configuration selection via the work station key board. Alternatively, the work station may be programmed to automatically select a particular default configuration.

Default configuration setting circuitry 22 provided, e.g., in the printer, responds to the first communications protocol address and, via a look-up table, provides instructions for implementing the default configuration associated with the first communications protocol address. The printer is then configured as a first VIRTUAL PRINTER, in accordance with the selected default configuration.

If a second work station user, or the same work station user, selects a second default configuration for second print job, the print data for the second print job is sent to a second communications protocol address (associated with the second default configuration). The default configuration setting circuitry 22 responds to the second communications protocol address and, via the look-up table, provides instructions for implementing the default configuration associated with the second communications protocol address. The printer is then configured as a second VIRTUAL PRINTER, in accordance with the second default configuration.

By sending print data for a further print job to the first communications protocol address, the printer default configuration of the first VIRTUAL PRINTER will be restored for the further print job. In addition to the default configuration for each VIRTUAL PRINTER, the context (or active configuration) of each VIRTUAL PRINTER is optionally preserved (e.g., via a memory circuit as discussed above) and may be restored between print jobs. Thus, if, for example, the user of the first work station was using, as an active configuration, a form blank and had printed a completed form using the first VIRTUAL PRINTER, upon restoring the first VIRTUAL PRINTER, the user would also restore the form blank. This can be extremely efficient and cost saving in networks wherein a particular context is used over and over by the same or different work station users.

Consider, for example, a computer network in an accounting firm, wherein several accountants are connected, via their individual work stations to a computer network. An accountant may wish to fill out a first form blank (e.g., a tax form 1040A) for one client and a second form blank (e.g., a balance sheet form) for another client. Assuming that the first and second blank forms are implemented by software, e.g., via a template in a word processing software (e.g., WORDPERFECT, a trademark), the accountant first selects the template for the first form blank, fills in the blanks with appropriate information and sends the data as a print job to the first VIRTUAL PRINTER.

The accountant then selects the template for the second form blank, fills in the blanks with appropriate information and sends the data as a print job to the second VIRTUAL PRINTER. If, at a later time, the accountant wishes to fill out the first form blank for yet another client, the accountant may access the first VIRTUAL PRINTER and thereby not only restore the default configuration associated with the first VIRTUAL PRINTER, but also restore the context of the print job previously sent to the first VIRTUAL PRINTER, i.e., the form blank for the first form. Additionally, if a second accountant in the network wishes to fill out the second form blank for yet another client, the second accountant may access the second VIRTUAL PRINTER and thereby restore the default configuration associated with the second VIRTUAL PRINTER and the second form blank.

While the above example relates to a network in an accounting office, wherein various "contexts" comprise accounting forms, it will be understood that further embodiments of the invention may be configured for other types of office, lab, academic or other applications. Other types of "contexts" may be law forms, letter heads, blank graphs or tables, architectural, engineering or artistic drawings, or the like.

In further embodiments, context management schemes, such as context saving features and/or priority features, are provided. For example, as noted above, the context employed for one print job may be restored for additional print jobs. However, the ability to shift from one print job to another (and from one context to another) need not occur between print jobs, but may occur as an interruption of an on-going print job. For example, each VIRTUAL PRINTER (or, alternatively, each print job) may be provided with a parameter for indicating whether or not the printing operation may be interrupted by the presence of an additional print job. Thus, a print job being printed with a VIRTUAL PRINTER configuration (or context) having an "interruptable" code may be interrupted before the end of the print job for the printing of another print job, e.g., directed from an additional user to the same or different VIRTUAL PRINTER (or context). In this manner, large print jobs may be interrupted so that shorter print jobs can be printed. Likewise, lower priority print jobs may be interrupted so that higher priority print jobs may be printed. Preferably, the interruption control interrupts the first print job on a page boundary.

For example, a first print job may be directed to the address associated with a first VIRTUAL PRINTER with a first context. A second print job directed to a second VIRTUAL PRINTER (or the same VIRTUAL PRINTER) may be sent to the printer during the printing operation of the first print job. If the first print job is interruptable (i.e., the first VIRTUAL PRINTER includes an "interruptable" parameter) the first VIRTUAL PRINTER will temporarily halt the printing of the first print job (e.g., at a suitable location, such as between pages). The printer will then be configured in accordance with the second VIRTUAL PRINTER and will print the second print job. Upon completion of the second print job, the printer will be restored with the first VIRTUAL PRINTER configuration (and the first context) and will proceed with the printing operation of the first print job. Thus, one print job may be interrupted for the processing and printing of a second print job and, upon completion of the second print job, the printer may be reconfigured for completing the processing of the first print job.

Figure 5A:
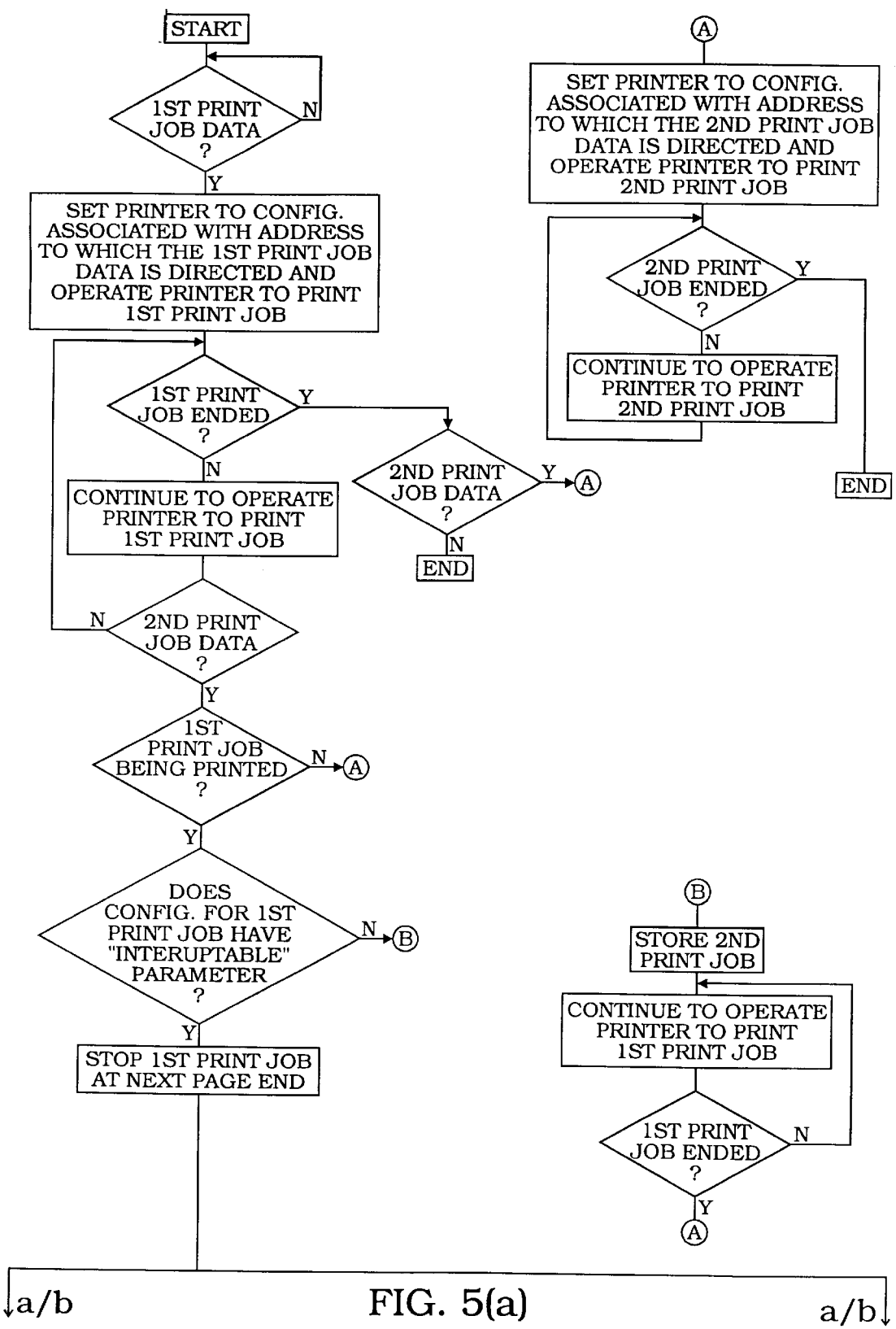
FIG. 5 is a flow chart showing an embodiment of an interruption feature.
Figure 5B:
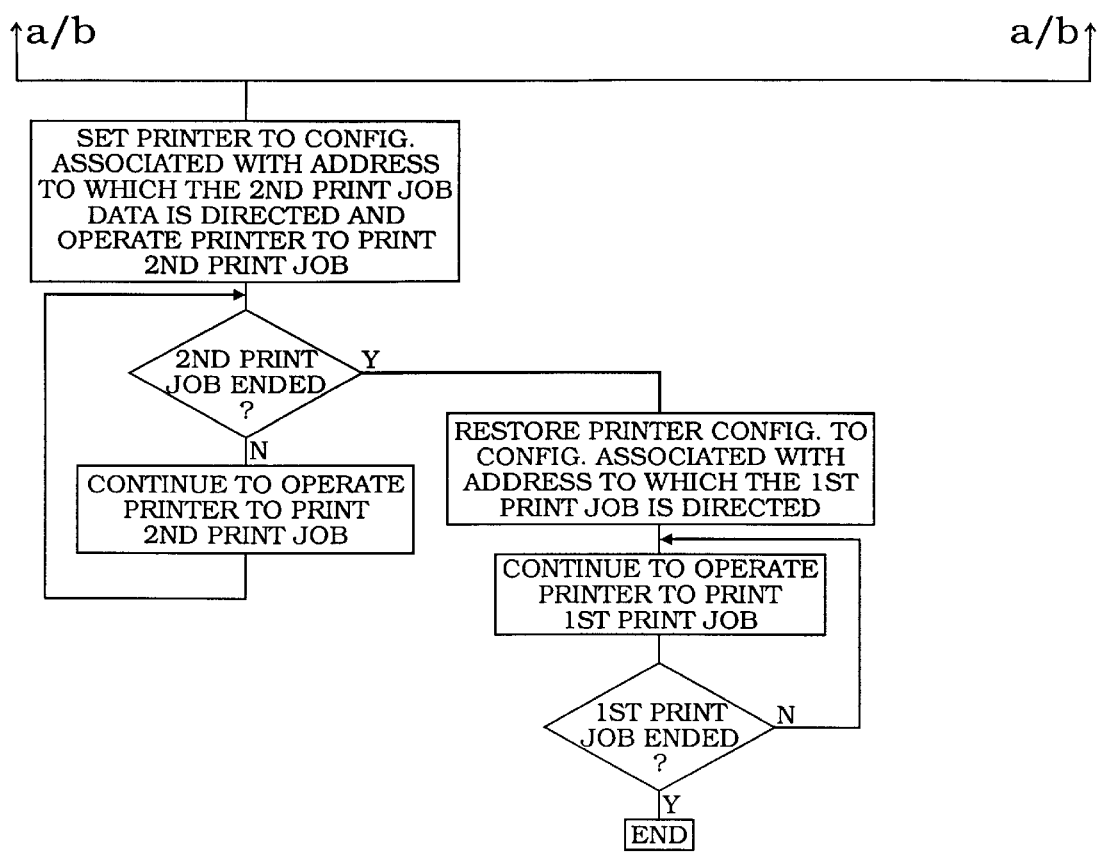

In preferred embodiments, each VIRTUAL PRINTER includes either an "interruptable" parameter or a "non-interruptable" parameter. A print job directed to a VIRTUAL PRINTER having an "interruptable" parameter may be interrupted during its printing operation, whereas a print job directed to a VIRTUAL PRINTER having a "non-interruptable" parameter would not be interrupted by the presence of an additional print job. Instead, the additional print job may be stored until the printer has completed the first print job. In this manner, the interruption control is provided by the operation parameters associated with the VIRTUAL PRINTERs and not be commands sent from the user. Thus, one or more VIRTUAL PRINTERs will be preset as "interruptable" or "non-interruptable." FIG. 5 shows a flow chart of an interruption control scheme according to an embodiment of the invention. In preferred embodiments, the controller of the print server has the capability to perform the yes or no determinations shown in the flow chart of FIG. 5. This capability may be implemented through hardware, software or a combination thereof.

In additional embodiments, each VIRTUAL PRINTER may have a parameter for "interrupting" or "non-interrupting" other print jobs. In such embodiments, the "interrupting" or "non-interrupting" parameter of the second print job received by the printer will determine whether or not the first print job being printed by the printer is to be interrupted or not. As an alternative or in addition to the "interruptable," "non-interruptable," "interrupting" or "non-interrupting" parameters, VIRTUAL PRINTERs may be provided with priority codes wherein one VIRTUAL PRINTER may take priority over another. In this manner, a print job directed to an address associated with a higher priority VIRTUAL PRINTER may interrupt a print job which was directed to the address associated with a lower priority VIRTUAL PRINTER. In preferred embodiments of this alternative design, the controller of the print server has the capability to determine the relative priorities of the various VIRTUAL PRINTERs and to control the interruption and printing functions of the printer. This capability may be implemented through hardware, software or a combination of both.

According to embodiments of the invention, multiple simultaneous communications protocols (e.g., LAT, TCP/IP, ETHERTALK (all believed to be trademarks), or the like) may be used and the VIRTUAL PRINTERs will be uniquely addressed in each available protocol. Priorities may be provided, e.g., by the end user, for governing the order in which multiple simultaneous print requests would be processed by the printer.

In further embodiments, the printer would automatically track resources used by each VIRTUAL PRINTER. Such resources may include, but are not limited to, images printed, physical sheets printed and bytes processed. In response to a command issued by an end user, the printer will provide a report and/or reset the resource statistics for all or a selected number of VIRTUAL PRINTERs. In preferred embodiments, a portion of the memory associated with the look-up table is devoted to this tracking and reporting feature.

In preferred embodiments, the status of the printer or of various VIRTUAL PRINTERs may be accessed by a user. For example, the printer controller can report various operation or resource information to a user, such as the identity of the print job presently being printed, toner status, paper supply status, paper tray status (e.g., which paper tray is coupled to the printer), or other information regarding the printer. A user accessing a particular VIRTUAL PRINTER may be provided with status information regarding that VIRTUAL PRINTER, such as the number of pages printed by that VIRTUAL PRINTER, configuration information regarding that VIRTUAL PRINTER, the availability of that VIRTUAL PRINTER, or whether or not the print configuration of the VIRTUAL PRINTER requires different paper or paper trays to be installed in the printer. Other information may be reported to the user, such as authorization parameters, default parameters and network parameters.

In further preferred embodiments, one or more VIRTUAL PRINTERs may be provided with selective access (or authorized access) features, such that only authorized users may access the VIRTUAL PRINTER. Thus, an authorized user may be provided with the capability to direct print job data to the address or addresses associated with specific VIRTUAL PRINTERs, while unauthorized users are not provided with such capabilities.

In yet further embodiments, the printer may include non-printing capabilities, such as, facsimile transmission capabilities, scanner capabilities, or other suitable capabilities. With such printers, one VIRTUAL PRINTER includes the configuration necessary for transmitting a facsimile. Another VIRTUAL PRINTER may include configurations necessary for scanning a document. Thus, a print job directed to the address associated with a facsimile transmission VIRTUAL PRINTER could be transmitted from the printer to a facsimile receiving device. Similarly, the facsimile VIRTUAL PRINTER could receive a facsimile transmission from an external device or incorporate facsimile data into additional data or context within a user's print job.

Further embodiments may employ a "print pending" feature which allows the printer to receive a print job and hold the print job until a further predefined code or signal is received by the printer. For example, a user may direct a print job to a particular VIRTUAL PRINTER address, wherein the VIRTUAL PRINTER includes a print pending parameter. The print job data is stored at the printer until an additional signal or code is received by the printer. This additional signal or code may be, for example, a personal identification number entered on the printer control panel itself or, alternatively, from the user station or other network location. This feature is helpful for situations wherein it is desirable to have the user present at the printer at the time that the print job is being printed. For example, a user may want to be present at the printer to load a particular type of paper into the printer before the print job is actually printed. This feature is also beneficial for printing confidential documents, wherein the user would want to be present at the printer as the document is being printed to ensure that the document isn't retrieved or seen by unauthorized persons.

Various combinations of the above features may be employed together.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A method of establishing a printer configuration for a printer, the method comprising the steps of:

providing print job data;

directing the print job data to an address associated with a printer configuration;

configuring a printer in accordance with the printer configuration associated with the address, in response to the direction of print job data to the address; and operating the printer in accordance with the print job data and the printer configuration associated with the address;

wherein the step of configuring the printer comprises the steps of:

associating the address with a corresponding set of printer configuration instructions; and configuring the printer in accordance with the corresponding set of configuration instructions associated with the address.

2. A method of establishing a printer configuration for a printer, the method comprising the steps of:

providing print job data;

directing the print job data to an address associated with a printer configuration;

configuring a printer in accordance with the printer configuration associated with the address, in response to the direction of print job data to the address; and operating the printer in accordance with the print job data and the printer configuration associated with the address;

wherein the step of directing the print job data comprises the step of transmitting a signal to the printer, the signal having a first component corresponding to the print job data and a second component corresponding to the selected address.

3. A method of establishing a printer configuration of a printer linked to a first data transmission station, the method comprising the steps of:

(a) providing a database and associated memory for a plurality of communications protocol addresses and a corresponding plurality of printer configuration control instructions, wherein each communications protocol address is uniquely associated with a respective set of printer configuration control instructions stored in the memory;

(b) selecting a first communications protocol address with the first data transmission station;

(c) directing a data signal for a first print job from the first data transmission station to the first communications protocol address;

(d) configuring the printer in accordance with the printer configuration control instructions associated in the database with the first communications protocol address; and (e) operating the printer in accordance with the first print job data and the printer configuration associated with the first communications protocol address.

4. A method as recited in claim 3, wherein a second data transmission station is linked to the printer, the method further comprising:

(f) selecting a second communications protocol address with the second data transmission station;

(g) directing a data signal for a second print job from the second data transmission station to the second communications protocol address;

and following step (e):

(h) establishing the printer configuration of the printer in accordance with the printer configuration control instructions associated in the database with the second communications protocol address; and (i) operating the printer in accordance with the second print job data and the printer configuration associated with the second communications protocol address.

5. A method as recited in claim 4, wherein the step of directing a data signal for the first print job comprises the steps of appending a signal corresponding to the first communications protocol address to the data signal; and transmitting the first print job data signal and appended address signal to the printer; and the step of directing a data signal for the second print job comprises the steps of appending a signal corresponding to the second communications protocol address to the data signal; and transmitting the second print job data signal and appended address signal to the printer.

6. A method as recited in claim 3, wherein the step of directing a data signal for the first print job comprises the steps of:

appending a signal corresponding to the first communications protocol address to the data signal; and transmitting the first print job data signal and appended address signal to the printer.

7. A method as recited in claim 3, wherein a second data transmission station is linked to the printer, the method further comprising:

(f) selecting a second communications protocol address with the second data transmission station;

(g) directing a data signal for a second print job from the second data transmission station to the second communications protocol address; and (h) associating a respective priority with the first and second communications protocol addresses;

(i) determining which of the first and second communications protocol addresses has higher priority;

(j) establishing the printer configuration of the printer in accordance with the printer configuration control instructions associated in the database with the higher priority communications protocol address;

(k) operating the printer in accordance with the printer configuration associated with the higher priority communications protocol address and in accordance with the print job data from the data transmission station with which the higher priority communications protocol address was selected.

8. A method as recited in claim 7, wherein, after step (k), the method further comprises the steps of.

(l) establishing the printer configuration of the printer in accordance with the printer configuration control instructions associated in the database with the lower priority communications protocol address;

(m) operating the printer in accordance with the printer configuration associated with the lower priority communications protocol address and in accordance with the print job data from the data transmission station with which the lower priority communications protocol address was selected.

9. A method as recited in claim 3, further comprising the steps of:

storing print job context data for a stored set of printer configuration instructions; and recalling stored print job context data upon configuring the printer in accordance with the established printer configuration instructions for which the print job context is stored.

10. Apparatus for establishing the printer configuration of a printer, the apparatus comprising:

an electronic circuit having a database and associated memory for a plurality of communications protocol addresses and a corresponding plurality of printer configuration control instructions, wherein each communications protocol address is uniquely associated in the database with a respective set of printer configuration control instructions stored in the memory;

a data transmission station having means for providing a data signal for a print job; transmission means for transmitting the print job data signal to the selected address; and control means for configuring the printer in accordance with the printer configuration associated with the address.

11. In a network having at least one user work station and at least one printer station coupled to the user work station by a communications network link, the printer station including a printer responsive to a set of printer configuration control instructions for configuring the printer's printer configuration, the improvement comprising apparatus for controlling the printer's printer configuration including:

means for mapping, coupled to the network communications link, for mapping a plurality of communications protocol addresses and a corresponding plurality of printer configuration control instructions, wherein each communications protocol address is uniquely associated in the database with a respective set of printer configuration control instructions stored in the memory;

means, associated with the at least one user work station, for selecting a communications protocol address and transmitting a signal corresponding to print data to the selected communications protocol address, through the network communications link; and means, associated with the means for mapping, for providing the set of printer configuration control instructions associated in the database with the communications protocol address to which the print data signal is sent, for configuring the printer's configuration.

12. Apparatus as recited in claim 11, further comprising means for storing print job context for each printer configuration; and means for recalling the print job context stored for a printer configuration upon configuring the printer with the printer configuration.

13. A network comprising:
a communications network link;

a first data transmission station for transmitting first print job data on the communications network link to a first communications protocol address;

a second data transmission station for transmitting second print job data on the communications network link to a second communications protocol address;

at least one printer station coupled to the communications network link for receiving the first and second print job data, the printer station including a printer responsive to a set of configuration control instructions for establishing the printer's printer configuration;

means for mapping a plurality of communications protocol addresses and a corresponding plurality of printer configuration control instructions, wherein each communications protocol address, including each of the first and second communications protocol addresses, is associated with a respective set of printer configuration control instructions;

said means for mapping coupled to the network communications link, for providing the established printer configuration control instructions associated with the first communications protocol address, to configure the printer's printer configuration for the first print job data, and for providing the established printer configuration control instructions associated with the second communications protocol address, to configure the printer's printer configuration for the second print job data.

14. Apparatus as recited in claim 13, further comprising context data storage circuitry associated with the means for mapping, for storing a print job context for the printer configuration associated with the first communications protocol address and for recalling a stored print job context upon configuring the printer with the printer configuration associated with the first communications protocol address.

15. Apparatus for establishing the configuration of a printer coupled to a network having a plurality of data transmission stations, each data transmission station capable of directing a print job data signal to a communications protocol address different from the communication protocol address to which print job data signal from at least one other data transmission station is transmitted, the apparatus comprising:

a network communications link circuit responsive to a plurality of communications protocol addresses, for receiving print job data directed to any one of the plurality of communications protocol addresses;

means for relating a plurality of communications protocol addresses to a corresponding plurality of printer configuration control instructions, wherein each communications protocol address is associated with a respective set of printer control instructions, the means for relating being operatively coupled to the network communications link circuit, to provide a set of printer configuration control instructions associated with the communications protocol address to which each print job data received by the network communications link circuit is directed.

16. Apparatus as recited in claim 15, further comprising context data storage circuitry associated with the means for relating, for storing a print job context for the printer configuration associated with one of said communications protocol addresses and for recalling a stored print job context upon configuring the printer with the printer configuration associated with said one communications protocol address.

17. Apparatus as recited in claim 15, further comprising priority means for associating a respective priority with each respective communications protocol address and for controlling the means for relating to provide sets of printer configuration control instructions in a chronological order, the chronological order being dependent upon the priorities associated with the communications protocol addresses that are associated with the printer configuration control instructions provided by the priority means.

18. Printing apparatus operable to be coupled to a network having a plurality of data transmission stations, each data transmission station capable of directing a print job data signal to a communications protocol address different from the communication protocol address to which print job data signal from at least one other data transmission station is transmitted, the printing apparatus comprising:

a printer operable according to printer configuration control instructions for printing data corresponding to print job data signals;

a network communications link circuit responsive to a plurality of communications protocol addresses, for receiving print job data directed to any one of the plurality of communications protocol addresses; and means for relating a plurality of communications protocol addresses to a corresponding plurality of printer configuration control instructions, wherein each communications protocol address is associated with a respective set of printer control instructions, the means for relating being operatively coupled to the network communications link circuit and the printer, to provide the printer with a set of printer configuration control instructions associated with the communications protocol address to which each print job data received by the network communications link circuit is directed.

19. Apparatus as recited in claim 18, further comprising context data storage circuitry associated with the means for relating, for storing a print job context for the printer configuration associated with one of said communications protocol addresses and for recalling a stored print job context upon providing the printer with the printer configuration associated with said one communications protocol address.

20. Apparatus as recited in claim 18, further comprising priority means for associating a respective priority with each respective communications protocol address and for controlling the means for relating to provide sets of printer configuration control instructions in a chronological order, the chronological order being dependent upon the priorities associated with the communications protocol addresses that are associated with the printer configuration control instructions provided by the priority means.

21. Apparatus for establishing a printer configuration for a printer in accordance with print job data directed to a communications protocol address associated with the printer, the apparatus comprising:

printer configuring means for associating the communications protocol address to which the print job data is directed with a printer configuration and for configuring the printer in accordance with the printer configuration associated with the communications protocol address, in response to the direction of print job data to the communications protocol address; and printer operating means for operating the printer in accordance with the print job data and the configuration associated with the communications protocol address;

wherein the printer configuring means comprises a means for relating a plurality of communications protocol addresses to a corresponding plurality of printer configuration control instructions, wherein each communications protocol address is associated with a respective set of printer control instructions, the means for relating being operatively coupled to the printer, to provide the printer with a set of printer configuration control instructions associated with the communications protocol address to which the print job data is directed.

22. A network comprising:

a communications network link;

first and second data transmission stations, each coupled to the communications network link, for transmitting print job data over the communications network link to first and second communications protocol addresses, respectively;

a printer station coupled to the communications network link, responsive to print job data transmitted by said first and second data transmission stations over the communications network link to said first and second protocol addresses, respectively, and supporting at least a first and a second printer configuration, said printer station comprising a controller:

(a) for configuring the printer station to said first printer configuration in response to print job data received from said first data transmission station over the communications network link to said first protocol address, and (b) for configuring the printer station to said second printer configuration in response to print job data received from said second data transmission station over the communications network link to said second protocol address.

23. Apparatus for establishing a printer configuration for a printer in accordance with print job data directed to a communications protocol address associated with the printer, the apparatus comprising a controller for associating the communications protocol address to which the print job data is directed with a printer configuration and for configuring the printer in accordance with the configuration associated with the communications protocol address, in response to the direction of print job data to the communications protocol address, wherein the controller comprises means for relating a plurality of communications protocol addresses to a corresponding plurality of printer configuration control instructions, wherein each communications protocol address is associated with a respective set of printer control instructions, the means for relating being operatively coupled to the printer, to provide the printer with a set of printer configuration control instructions associated with the communications protocol address to which the print job data is directed.

* * * * *